US006810623B2

(12) United States Patent
Messlez et al.

(10) Patent No.: US 6,810,623 B2
(45) Date of Patent: Nov. 2, 2004

(54) WINDOW GLASS CARRIER MEMBER FOR SLIDING WINDOW

(75) Inventors: Yan Messlez, Le Moulinet sur Solin (FR); Mustapha Mazouzi, Sully sur Loire (FR)

(73) Assignee: Meritor Light Vehicle Systems - France (FR)

( * ) Notice: Subject to any disclaimer, the term of this patent is extended or adjusted under 35 U.S.C. 154(b) by 53 days.

(21) Appl. No.: 10/068,296

(22) Filed: Feb. 5, 2002

(65) Prior Publication Data

US 2002/0139052 A1 Oct. 3, 2002

(30) Foreign Application Priority Data

Feb. 6, 2001 (FR) .......................................... 01 01561

(51) Int. Cl.[7] .............................................. E05F 11/48
(52) U.S. Cl. ........................................ 49/374; 49/352
(58) Field of Search ......................... 49/352, 349, 348, 49/324, 372, 374

(56) References Cited

U.S. PATENT DOCUMENTS 3,640,022 A * 2/1972 Kouth et al. .................. 49/420
4,483,100 A * 11/1984 Blankenburg et al. ........ 49/352
4,700,508 A 10/1987 Kollner et al.
4,878,391 A 11/1989 Komatsu et al.
4,890,376 A * 1/1990 Boileau ....................... 29/434
4,922,783 A * 5/1990 Wallace ..................... 74/502.4
5,005,316 A * 4/1991 Hornivius .................... 49/348
5,505,022 A * 4/1996 Shibata et al. ................ 49/352
5,970,658 A * 10/1999 Smith ......................... 49/352

FOREIGN PATENT DOCUMENTS

FR 2 552 720 A 4/1985
FR 2 728 008 12/1994

* cited by examiner

*Primary Examiner*—Gregory J. Strimbu
(74) *Attorney, Agent, or Firm*—Carlson, Gaskey & Olds

(57) ABSTRACT

A carrier member for a vehicle window winding mechanism includes a passage for a rail along which the carrier member slides, and at least one tab or tongue that applies a force to the rail in a direction perpendicular to the direction of sliding of the carrier member and parallel to the plane of a window glass. The carrier member avoids problems of noise or undesirable forces originating from faulty alignment or assembly of the rail.

15 Claims, 2 Drawing Sheets

4
30
12
24
14
20
8
22
26
16
10
6
28
18
x
2
32
y
z

FIG_1
4
12
30
24
14
8
20
22
26
16
10
6
28
18
2
32
x
y
z

WINDOW GLASS CARRIER MEMBER FOR SLIDING WINDOW

BACKGROUND OF THE INVENTION

The invention relates to window lifting mechanisms used in vehicle doors, and more particularly to a sliding window glass carrier member.

Window lifting mechanisms used in the doors of automobile vehicles generally have one or several guide rails. A window glass carrier member can move in translation on each rail. The carrier member or carrier members support the window glass, optionally via an intermediate carrier member. The carrier member or members are driven to move, through a manual or motor-driven mechanism, via cables.

French patent application 2,728,008 discloses a vehicle window lifter having two front and rear guide rails, a sliding carrier member sliding on each rail. The carrier members support the window glass and are driven along the rails by a system of cables. The cables pass over direction-changing pulleys at the ends of the rails and are driven by a motor. That patent does not stipulate the shape of the rail nor the shape of the sliding carrier member.

U.S. Pat. No. 4,700,508 discloses a window lifter for the sliding glass of an automobile vehicle. This window lifter has one single rail on which a carriage, particularly constituted by two slide elements connected by a plate, slides. The slide elements are driven in translation along the rail by two cables which slide in pulleys located at the end of the rail. The rail has two flanges one of which extends parallel and the other perpendicular to the window glass. The end of each flange is folded over to form an elastic pressure strip. Clearance is provided for between the pressure strip and the corresponding flange to allow movement of the flange. The corresponding facing surfaces of a flange and pressure strip form supporting surfaces and act to guide the slide elements. In the rest state, the supporting surfaces form a small acute angle; the angle is small as the pressure strips are only there to take up play arising through wear, which is of the order of several hundredths to several tenths of a millimeter. The carriage has, for each flange, a channel with parallel walls. Each channel is supported on the rails by the support surfaces of the flanges and pressure strips. Elasticity of the flanges eliminates play, even after long periods of operation. The solution proposed in that patent is complex and notably requires particular shaping of the rail for constituting the elastic pressure strips.

Apart from the problem of wear raised in U.S. Pat. No. 4,700,508, there is the problem of mounting the window lifter rail(s) and/or the problem of the transverse force exercised by the carriage on a rail.

The window glass is mounted in two slideways provided at each side of the rail; in the case of a single rail, the window glass is secured to a carriage mounted for translatory movement on the rail, also ensuring correct orientation of the window glass. In theory, there is sufficient clearance between the window glass and the slideways to limit any force exercised by the window glass on the carriage in the plane of the window glass and perpendicular to the direction of translatory movement of the carriage. In practice, it can happen that the rail is not perfectly mounted which is reflected by an offset between the axis of translation of the window glass and the rail axis; in this case, while the carriage is moving, a force can be set up in a direction perpendicular to the rail, in the plane of the window glass. This problem can also occur when one or both slideways are incorrectly mounted.

In the case of two rails, the window glass is secured on two carriages each mounted on rails. Simultaneous movement of both carriages on the two rails ensures lateral guiding of the window glass and renders the use of slideways at both sides of the window glass superfluous. Again, incorrect mounting on the rails or the window glass on the carriages can lead to forces being exercised on the rails in a direction perpendicular to the translatory movement of the carriages and in the plane of the window glass. Thus, a lack of parallelism between the rails can be a source of forces in view of the fixed distance between the carriages; similarly, faulty securing of the carriages on the window glass can lead to transverse forces, even if the rails are parallel. The forces on a rail, in a direction perpendicular to the translatory movement of the carriage and in the plane of the window glass are a source of noise and/or a need to exercise forces higher than the normal force required to raise and lower the window glass. There is a need to resolve this new problem.

SUMMARY OF THE INVENTION

Briefly, in one embodiment of this invention, there is provided a earner member having at least one tab or tongue flexible in a direction transverse to the guide rail. The tongue enables forces exercised by the carrier member on the rail to be taken up in a direction contained in the plane of the window glass and perpendicular to be direction of translation of the cater member. The latter can consequently take up clearances originating from approximate mounting of the slideways or rails, in a single or double-lift window winding mechanism.

More precisely, the invention provides a carrier member for a vehicle window winding mechanism, having a passage for a rail along which said carrier member slides, and at least one tab or tongue applying a force to said rail in a direction perpendicular to the direction of sliding of the carrier member, and parallel to the plane of a window glass.

In one embodiment, the passage opens at one face of the carrier member, and the tongue acts on the rail in a direction parallel to said face of the carrier member.

Preferably, the carrier member has two tongues, facing each other. In this case, it is advantageous when the passage has, in the direction in which the tongues exercise their force, a dimension greater than the distance between the two tongues. It is also advantageous for the tongues to be aligned with the passage.

The invention also provides a window winding mechanism, comprising a guide rail and such a carrier member.

The passage advantageously has, in the direction in which the tongues exercise their force, a dimension close to 200% of the dimension of the rail in said direction. It is also advantageous when the carrier member has two tongues, and a distance between the two tongues in the rest condition is of the order of 80% of the rail dimension in the direction in which the tongues exercise their force.

Further characteristics and advantages of the invention will become more clear from the description which follows of some embodiments thereof provided by way of example and with reference to the attached drawings.

DETAILED DESCRIPTION OF THE INVENTION

The invention provides, on the window lifter sliding carrier member, one or several flexible tongues or tabs which allow forces exercised by the carrier member on the rail in a direction perpendicular to the movement of the carrier member and in the plane of the window glass to be absorbed. Below, an ortho-normalized reference frame is used in which:

- the z-direction is a direction of translation of the window glass in the window lifter, in other words the direction in which the window lifter rail extends; the positive sense of the said axis extends upwardly, in other words in the direction of closing of the window;
- the x-direction is the direction transverse to the direction of translation of the carrier member, extending in the plane of the window glass; in the case of a vehicle door window glass, the x-direction is the direction parallel to the door in other words the direction in which the vehicle travels;
- the y-direction completes the 3-axis reference frame; it is perpendicular to the direction of translation of the carrier member and to the window glass plane; for a vehicle door, the y-direction is perpendicular to the direction of travel of the vehicle.

Figure 1:
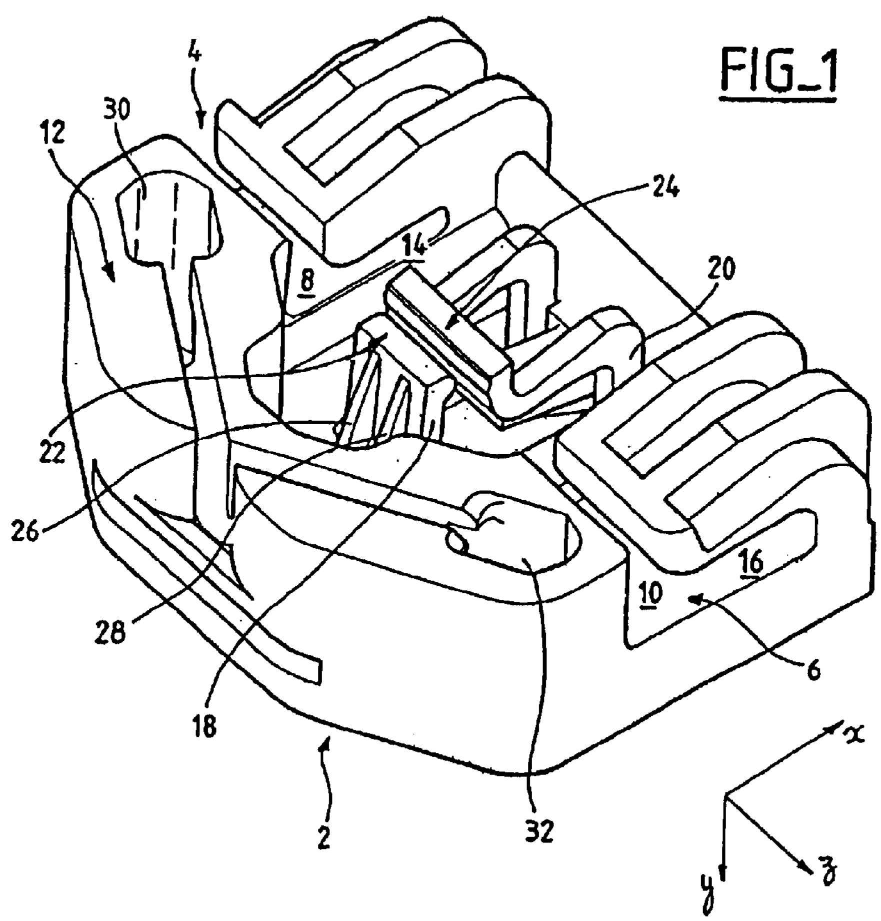
FIG. 1 is a view in perspective of a carrier member according to one embodiment of the invention.

FIG. 1 is a perspective view of a window glass sliding carrier member according to one embodiment of the invention. The carrier member 2 of FIG. 1 is designed to be mounted on a rail shown in cross section on FIG. 2. It can be employed in double-lift or single-lift window winding mechanisms.

Figure 2:
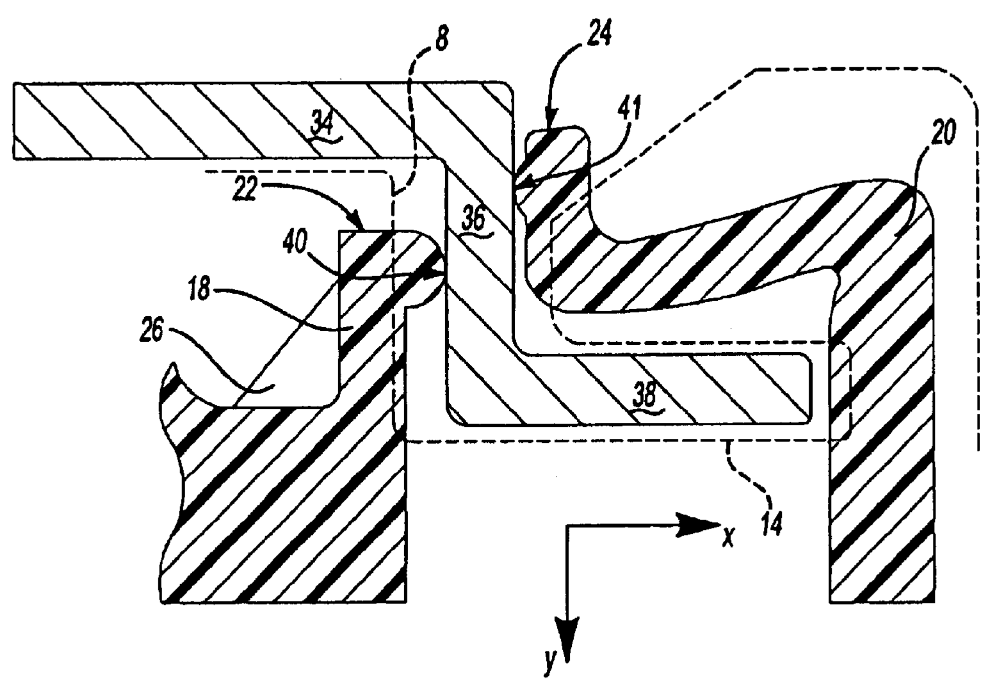
FIG. 2 shows a cross section through a rail and the carrier member of FIG. 1, transverse to the direction of translatory movement of the carrier member.

The carrier member 2 has a main body in which the passages 4, 6 for the rail on which the cater member is designed to slide are defined. As shown in FIG. 2, the rail has a 21-shape cross section. The rail has a first portion 34 secured against the vehicle door, a second portion 36 extending substantially perpendicular to the first portion and to the vehicle door, and a third portion 38 parallel to the first portion 34 and extending, with respect to the second portion 36, on the opposite side to the first portion 34. The passages 4 and 6 consequently have an L-shaped cross section. One arm of the "L" 8, 10 extends perpendicular to the window glass direction and is designed to receive the second rail portion. The arm 8, 10 of the "L" opens at the surface of the carrier member 2 at its main face 12 which, in operation, will extend along the vehicle door onto which the rail is secured. The second arm 14, 16 of the "L" extends parallel to the window glass direction and is designed to receive the third rail portion 38. This second arm 14, 16 is parallel to the main face 12 of the carrier member 2, and is offset with respect thereto.

Apart from the passages 4 and 6, the carrier member 2 has two flexible tongues or tabs 18, 20. The two tongues 18, 20 each have a contact face 40, 41. The faces 40, 41 have a substantially cylindrical shape with an axis parallel to the z axis, such shape reducing sliding friction. The two faces 40, 41 in their rest position shown in FIG. 1 are at least as close to each other as the thickness of the rail at the second portion 36. Thus, the two faces 40, 41 apply a slight force to the second rail portion 36 when the carrier member 2 is mounted on the rail.

The facing sides of the first arm 8, 10 of the passages 4 and 6 are spaced by a greater distance than the thickness of the second rail portion 36, ensuring unhindered sliding of the carrier member 2 on the rail at these passages. Additionally, the edges are also, preferably, sufficiently far from each other to ensure that, even when the rails are incorrectly mounted, movement of the carrier member 2 from its raised position to its lowered position is achieved without friction of the L-shape of the carrier member 2 on the rail. Thus, in all carrier member 2 positions, contact in the x-axis direction between the carrier member 2 and second rail portion 36 essentially takes place at the contact surfaces 40, 41.

The contact surfaces 40, 41 of the tongues 18, 20 cooperate with the second rail portion 36. The two tongues 18, 20 are flexible or elastic, whereby a force applied in the x-direction as defined above will compress the tongue subject to that force, while the second tongue will yield. Therefore, at least one of the tongues is always compressed thereby ensuring the permanent presence of a force exercised by the carrier member 2 on the rail. This avoids the carrier member 2 from moving off course in the x-direction. Generally, the two tongues 18, 20 are always in contact with the rail, one being compressed and the other extended. However, it can be imagined that, in some cases where the tolerances to be taken up are significant and where tongue flexibility is limited, only one tongue can remain in contact with the rail.

The flexibility of the tongues 18, 20 in the example of FIG. 1 is ensured by their structure. The tongue 18 extends substantially in the y-direction perpendicular to the direction of translation of the carrier member 2 and to the plane of the window glass.

In practice, and depending on rail geometry, the distance between the tongues 18, 20 is of the order of 1 mm, while the distance between the edges of the first arm of the passage 4 or the passage 6 is of the order of 2 to 3 mm. Compared to the rail size, the distance between the tongues 18, 20 in the rest state is of the order of 80% of the rail thickness in the x-direction, and the distance between the facing edges of the passages 4 and 6 is of the order of 200% of this thickness. When the tongues 18, 20 are deformed elastically, they can move apart by a distance at least equal to the distance between the facing edges of the passages 4 and 6.

In this way, in operation as shown in FIG. 2, the tongues 18, 20 exercise pressure against the rail and maintain the carrier member 2 in the x-direction. Tongue flexibility is measured by a coefficient of stiffness less than that of the walls 4 and 6. Compared to the tongues 18, 20, the walls 4 and 6 are rigid. In FIG. 1, the strength members 26, 28 provided behind the tongue 18 can be seen, allowing tongue 18 stiffness to be regulated. The shape of the tongue 20 will also be noted, the flexibility thereof being provided by the "S" shape visible in FIG. 1.

Tongue length in the z-direction can vary. The greater the extension of the tongue in the said direction, the greater the guiding effect and the force exercised on the rail in the z-direction. On the other hand, increasing the tongue length in the z-direction can increase sliding friction between the tongue 18, 20 and the rail.

In a manner known, the carrier member 2 also includes members for receiving carrier member operating cables. The openings 30 and 32 receive the ends of the carrier member drive cables. These cables are not shown in FIG. 1 and can be driven manually or by an operating motor.

The carrier member 2 in FIG. 1 can be produced by injection molding of a plastic material such as poly-acetal. Such material has the advantage of possessing a low coefficient of sliding friction.

FIG. 2 is a diagrammatic view in section of the cattier member 2 of FIG. 1 and of the rail, in a plane perpendicular to the longitudinal direction of the rail; and passing through the tongues 18, 20. Here, the first rail portion 34 will be recognized, the later being intended to be secured against the vehicle door. The second rail portion 36 is engaged in the first arm 8, 10 of the passages 4 and 6. The third portion 38 of the rail is engaged in the second arm of the passage. As shown in FIG. 2, the tongues 18 and 20 bear against the second rail portion 36, at both sides thereof. The edge of the passage 4 is shown in dashed lines on FIG. 2. It can be seen that contact between the carrier member 2 and the rail, in the x-direction, is provided by the tongues 18, 20. The diagram does not show the manner of securing the carrier member 2 onto the window glass.

The carrier member 2 and the rail operate as follows. The carrier member 2 is introduced onto the rail so as to be able to slide in the longitudinal direction of the rail, when driven by the drive cables. In the x-direction, clearance between the rail and the passages 4, 6 of the carrier member 2 is between 0.5 and 2 mm. This clearance is defined as the difference between the passage dimension and the corresponding rail dimension. As the clearance is less than 2 mm, the passages 4 and 6 have a guiding function for the carrier member 2 in the z-direction of translation. Nevertheless, the clearance is greater than 0.5 mm in the x-direction, the carrier member 2 can move with respect to the rail in the x-direction, thereby limiting forces in this direction brought about by incorrect mounting or alignment of the rail(s), slideways, or of the window glass on a carrier member 2.

The rail is subject to a slight force in the x-direction provided by the tongues 18, 20. The force exercised by the tongues 18, 20 avoids any noise or significant stresses being applied to the rail by the carrier member 2. In this way, if assembly is as planned, the carrier member 2 in FIG. 1 avoids noise and ensures stable operation over time of the window winding mechanism. If the assembly is defective, the carrier member 2 avoids the presence of forces in the x-direction, as well as noise. A window winding mechanism fitted with a carrier member 2 of the type in FIG. 1 is noiseless even if it has not been perfectly mounted. The user, when the window is operated manually, does not feel any "hard" points in the upward or downward travel of a window glass. When the latter is motor-driven, excessive forces on the motor are avoided.

The force that the tongues 18, 20 exercise on the rails is advantageously selected as will now be described. The lower value for this force is a function of the habitual conditions applying to winding mechanisms in use. It is sufficiently large to ensure the carrier member 2 is maintained in the x-direction under the habitual conditions applying to window winding mechanisms; the upper value depends on the degree of force to be exercised in order to move the carrier member along the rail. The tongue force is calculated as a function of maximum accepted values of the latter.

Clearly, the present invention is not limited to the examples and embodiments described and illustrated, but may be subject to numerous variations available to those skilled in the art. In the example of the drawings, the carrier member 2 has two tongues 18, 20 or tabs one at each side of the rail, each facing the other. It is possible to only provide one single tongue in the cater member 2. In this case, the tongue acts on the rail to press it against one surface of the passage provided for the rail. It is not essential that the abutment surface be opposite the tongue. Thus, in the example of FIG. 1, the tongue 18 could be eliminated. In this case the tongue 20 would act on the rail to urge it against the wall of the first arm 8, 10 of the passages 4, 6. In this case, the tongue is preferably defined with a flexibility range able to take up maximum variations, to ensure that it remains permanently under pressure against the rail.

The tongues could also be offset in the direction of translation of the carrier member, or a greater number of tongues could be provided. Three tongues can for example be provided, with one at one side of the rail and two tongues at the other side of the rail, at both sides of the first tongue in the longitudinal direction of the rail. This 3-tongue configuration ensures a guiding effect, without an accompanying increase in the surface of contact between the tongues and the rail. Four tongues can be provided, in the form, for example, of two sets of two tongues facing each other. This solution, like the 3-tongue solution, improves guiding.

It is also clear that the invention is not limited to the preferred embodiment for the rail; the third rail portion and second arm 14, 16 of passages 4, 6 are designed to ensure the carrier member is retained in the y-direction; they could have a different shape; more generally, the tongues could apply a force to the rail in the x-direction, but via a portion other than the one ensuring guiding in this direction; for example, by bearing against the end of the third rail portion. The rail can have a different shape—with for example, a fourth portion extending from the free end of the third portion, parallel to the second portion; in this case, the tongues could bear against this fourth portion. In the example, the carrier member has two passages for the rail; only one single passage, or more than two passages, could be present.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A carrier member for a vehicle window winding mechanism comprising:

a passage for a rail along which said carrier member slides; and at least one tab applying a force to said rail in a direction perpendicular to a direction of sliding of the carrier member and parallel to a plane of a window glass of the winding mechanism, and said at east one tab allowing for displacement of said carrier member in said direction perpendicular to said direction of sliding, wherein said at least one tab forms an S-shaped tongue.

2. The carrier member according to claim 1, wherein said carrier member includes a face and said passage opens at said face of said carrier member, and said at least one tab acts on said rail in a direction parallel to said face of said carrier member.

3. The carrier member according to claim 1, further comprising a second tab, and said at least one tab faces said second tab.

4. The carrier member according to claim 3, wherein the passage includes a dimension and a distance is defined between said at least one tab and said second tab, and said dimension is greater than said distance.

5. The carrier member according to claim 4, wherein said at least one tab and said second tab are aligned with said passage.

6. The carrier member according to claim 5 wherein said distance is variable.

7. The carrier member according to claim 3, wherein said at least one tab and said second tab are aligned with said passage.

8. The carrier member of claim 3, wherein said second tab exercises a force on said rail.

9. The carrier member according to claim 1, wherein said at least one tab is flexible.

10. The carrier member according to claim 1, wherein said at least one tab includes a hemi-spherical projection.

11. A window winding mechanism comprising:

a guide rail;

a carrier member having a passage for the guide rail along which said carrier member slides; and at least one tab applying a force to said guide rail in a direction perpendicular to a direction of sliding of the carrier member and parallel to a plane of a window glass, and said at least one tab allowing for displacement of said carrier member in said direction perpendicular to said direction of sliding, wherein said at least one tab forms an S-shaped tab.

12. The window winding mechanism according to claim 11, wherein said passage has a passage dimension and said guide rail has a rail dimension, and said passage dimension is approximately 200% of said rail dimension.

13. The window winding mechanism of claim 12, further comprising a second tab and a distance between said at least one tab and said second tab in a rest condition is approximately 80% of said rail dimension.

14. The window winding mechanism of claim 13, wherein said second tab exercises a force on said guide rail.

15. The window winding mechanism according to claim 11, wherein said at least one tab is flexible.

* * * * *

UNITED STATES PATENT AND TRADEMARK OFFICE
CERTIFICATE OF CORRECTION

PATENT NO. : 6,810,623 B2
DATED : November 2, 2004
INVENTOR(S) : Messiez et al.

It is certified that error appears in the above-identified patent and that said Letters Patent is hereby corrected as shown below:

Title page,
Item [75], Inventors, "Yan Messlez" should read as -- Yan Messiez --.

Column 6,
Line 47, "east" should read as -- least --.
Line 66, "5" should read as -- 4 --.

Signed and Sealed this

Eighth Day of February, 2005

JON W. DUDAS
*Director of the United States Patent and Trademark Office*